US008144979B2

(12) United States Patent
Kuo

(10) Patent No.: US 8,144,979 B2
(45) Date of Patent: Mar. 27, 2012

(54) AUTOMATIC COLOR CONTRAST ANALYZER

(75) Inventor: Heng-Chun Scott Kuo, Surrey (CA)

(73) Assignee: SAP France, Levallois-Perret (FR)

( * ) Notice: Subject to any disclaimer, the term of this patent is extended or adjusted under 35 U.S.C. 154(b) by 1013 days.

(21) Appl. No.: 12/105,510

(22) Filed: Apr. 18, 2008

(65) Prior Publication Data

US 2009/0263016 A1  Oct. 22, 2009

(51) Int. Cl.
*G06K 9/34* (2006.01)
(52) U.S. Cl. ......... 382/164; 382/162; 382/167; 382/176
(58) Field of Classification Search .................. 382/162, 382/167, 165, 176, 172, 181, 263, 164, 180; 386/353, E9.013, E9.04; 345/597, 447
See application file for complete search history.

(56) References Cited

U.S. PATENT DOCUMENTS 6,389,162 B2 * 5/2002 Maeda .......................... 382/172

OTHER PUBLICATIONS

"Contrast Analyser, Version 2.0", [Online]. Retrieved from the Internet: <URL:http://www.paciellogroup.com/resources/contrast-analyser.html>,(Apr. 30, 2008),5 pgs.

"G18: Ensuring that a contrast ratio of at least 5:1 exists between text and background behind the text", [Online]. Retrieved from the Internet: <URL:http://www.w3.org/TR/2007/WD-WCAG20-TECHS-20070517/Overview.html#G18>, (Apr. 30, 2008),1 pg.

ETRE, "Colour Check", [Online]. Retrieved from the Internet: <URL:http:/www.etre.com/tools/colourcheck/>,(Apr. 30, 2008), 1 pg.

Snook.CA, "Colour Contrast Check", [Online]. Retrieved from the Internet: <URL:http://snook.ca/technical/colour_contrast/colour.html>,(Apr. 30, 2008),2 pgs.

* cited by examiner

*Primary Examiner* — Anh Hong Do
(74) *Attorney, Agent, or Firm* — Schwegman, Lundberg & Woessner, P.A.

(57) ABSTRACT

A computerized method and apparatus to analyze color contrast are provided. In an example embodiment, a computer readable storage medium is provided that comprises executable instructions. When executed, the instructions access data associated with a visual representation including text and perform optical character recognition on the visual representation to identify at least one character of the text. Further color data is extracted from a first area and a second area, the first area forming part of the at least one character and the second area external to the at least one character; and calculate a color contrast value based on the first and second areas. The instructions to access the data, perform the optical character recognition, extract the color data and calculate the color contrast are performed sequentially and automatically by a processor without human intervention.

20 Claims, 17 Drawing Sheets

AUTOMATIC COLOR CONTRAST ANALYZER

FIELD

The present disclosure relates generally to analyzing color contrast in electronic media, for example electronic documents.

BACKGROUND

Color contrast in digital media, or documents printed from digital media, can determine the ease with which a person can view the contents of the media. For example, in a text document the color contrast between the text and surrounding regions affects the ease with which the text in the document can be read. This may be particularly relevant for people with visual impairments.

To accommodate visually impaired persons, guidelines such as the Web Content Accessibility Guidelines (WCAG) have been published. The WCAG provides guidelines how to make Web content (e.g., text and images) more accessible to people with disabilities.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth to provide an understanding of various example embodiments of the inventive subject matter. It will be evident, however, to one skilled in the art that embodiments of the inventive subject matter may be practiced without these specific details. In general, well-known instruction instances, protocols, structures, and techniques have not been shown in detail.

Overview

A computerized method and apparatus to analyze color contrast are provided. In an example embodiment, a computer-readable storage medium is provided that comprises executable instructions. When executed, the instructions access data associated with a visual representation, including text, and perform optical character recognition on the visual representation to identify at least one character of the text. Further, color data is extracted from a first area and a second area, the first area forming part of the at least one character and the second area external to the at least one character. Thereafter, a color contrast value is calculated based on the first and second areas. The instructions to access the data, perform the optical character recognition, extract the color data and calculate the color contrast may be performed sequentially and automatically by a processor without human intervention.

Example Embodiments

Figure 1:
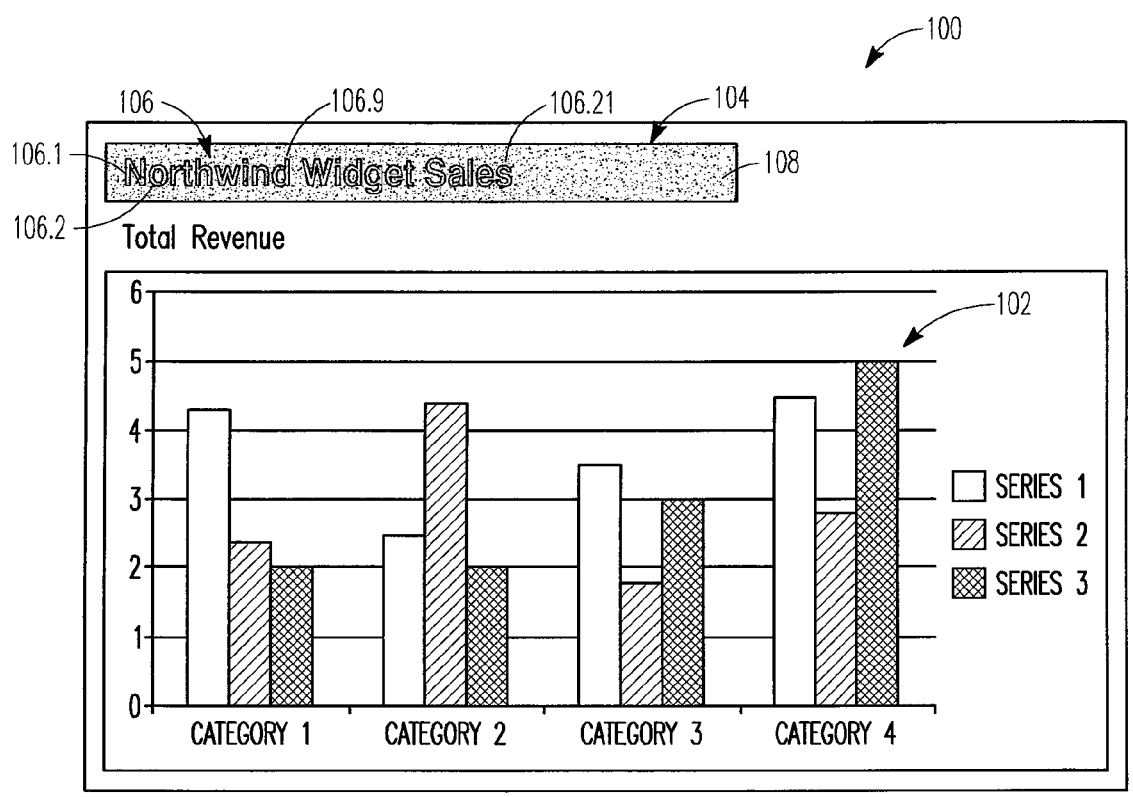
FIG. 1 shows an example screenshot of a visual representation displayed on a display screen of a computer monitor.
Figure 2:
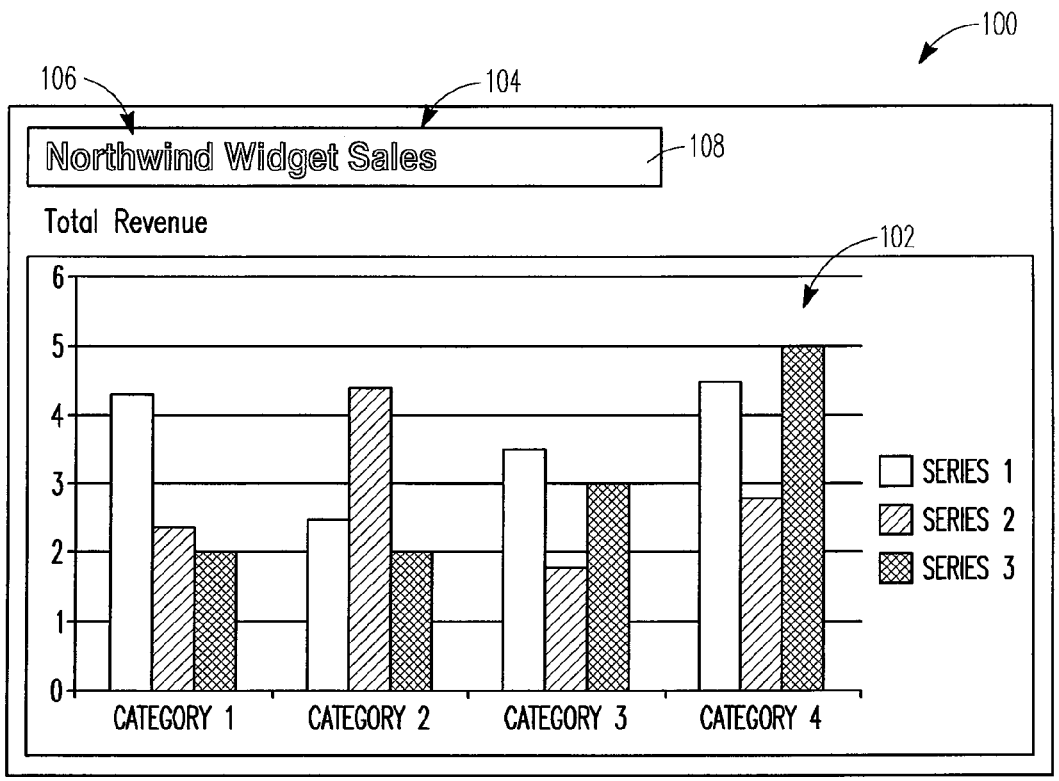
FIG. 2 shows the example visual representation of FIG. 1 after an automated method, in accordance with an example embodiment, has been performed to analyze color contrast.

FIG. 1 shows an example screenshot of a visual representation 100 displayed on a display screen of a computer monitor. In the example embodiment, the visual representation 100 is shown to be a presentation slide including a bar graph display area 102 and a text display area 104. Text 106 is displayed in the text display area 104. The text 106 is shown, by way of example, to read "Northwind Widgets Sales". In the example illustrated, the text 106 includes a plurality of characters or letters 106.1-106.21 that are displayed in a background area 108. It will be appreciated that the ease at which the text 106 can be read is dependent upon a color contrast between a color(s) selected for the text 106 and a color(s) selected for the background area 108. In certain circumstances where the color contrast between the text 106 and the background area 108 is insufficient, a user with a visual impairment may have difficulty in reading the text 106. Accordingly, in an example embodiment, a computerized method and apparatus is performed that analyzes a color contrast between a color selected for the text 106 and a color selected for the background area 108. When a color contrast of the text 106 and the background area 108 is insufficient, the text and/or the background area 108 may be modified so as to render the text more easily readable. For example, as shown in FIG. 2, the luminosity and saturation intensity of the background area 108 may be reduced to enhance the color contrast between the text 106 and the background area 108. In an example embodiment, the color contrast is analyzed at multiple points where the text 106 and the background area intersect.

Figure 3:
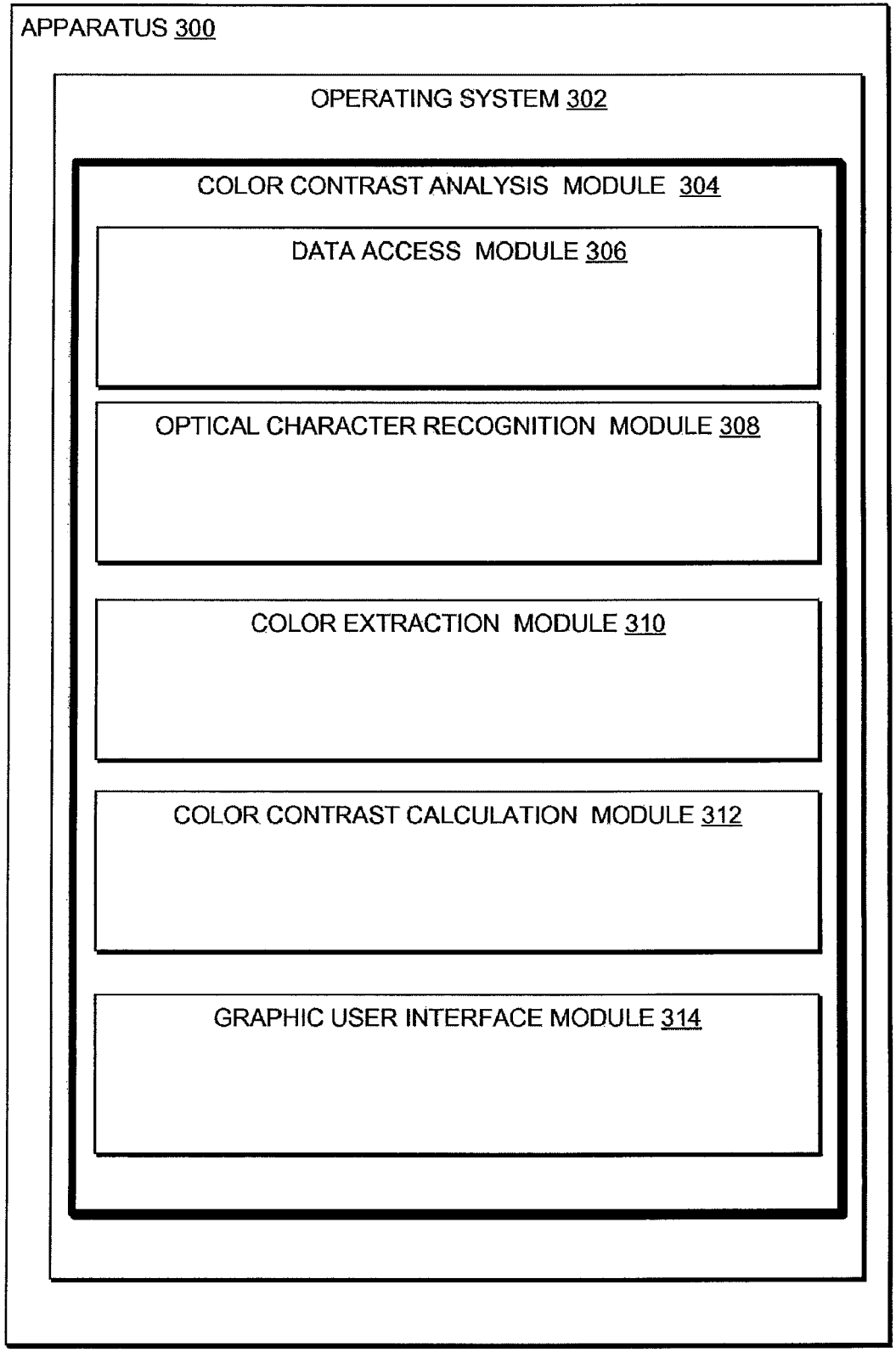
FIG. 3 shows a schematic diagram of apparatus, in accordance with an example embodiment, to analyze color contrast in a visual representation.

FIG. 3 shows a schematic diagram of apparatus 300, in accordance with an example embodiment, to analyze color contrast in a visual representation. The apparatus 300 may analyze the visual representation 100 shown in FIG. 1 and, accordingly, is described by way of example with reference thereto.

The apparatus 300 includes memory to store an operating system 302 and instructions to automatically, without human intervention, perform a color contrast analysis on a visual representation. As described in more detail with reference to FIG. 4, the apparatus 300 includes a color contrast analysis module 304 that comprises a data access module 306, an optical character recognition (OCR) model 308, a color extraction module 310, a color contrast calculation module 312, and a graphical user interface module 314. The modules 306-314 may be implemented fully in software or hardware or any combination thereof.

Figure 4:
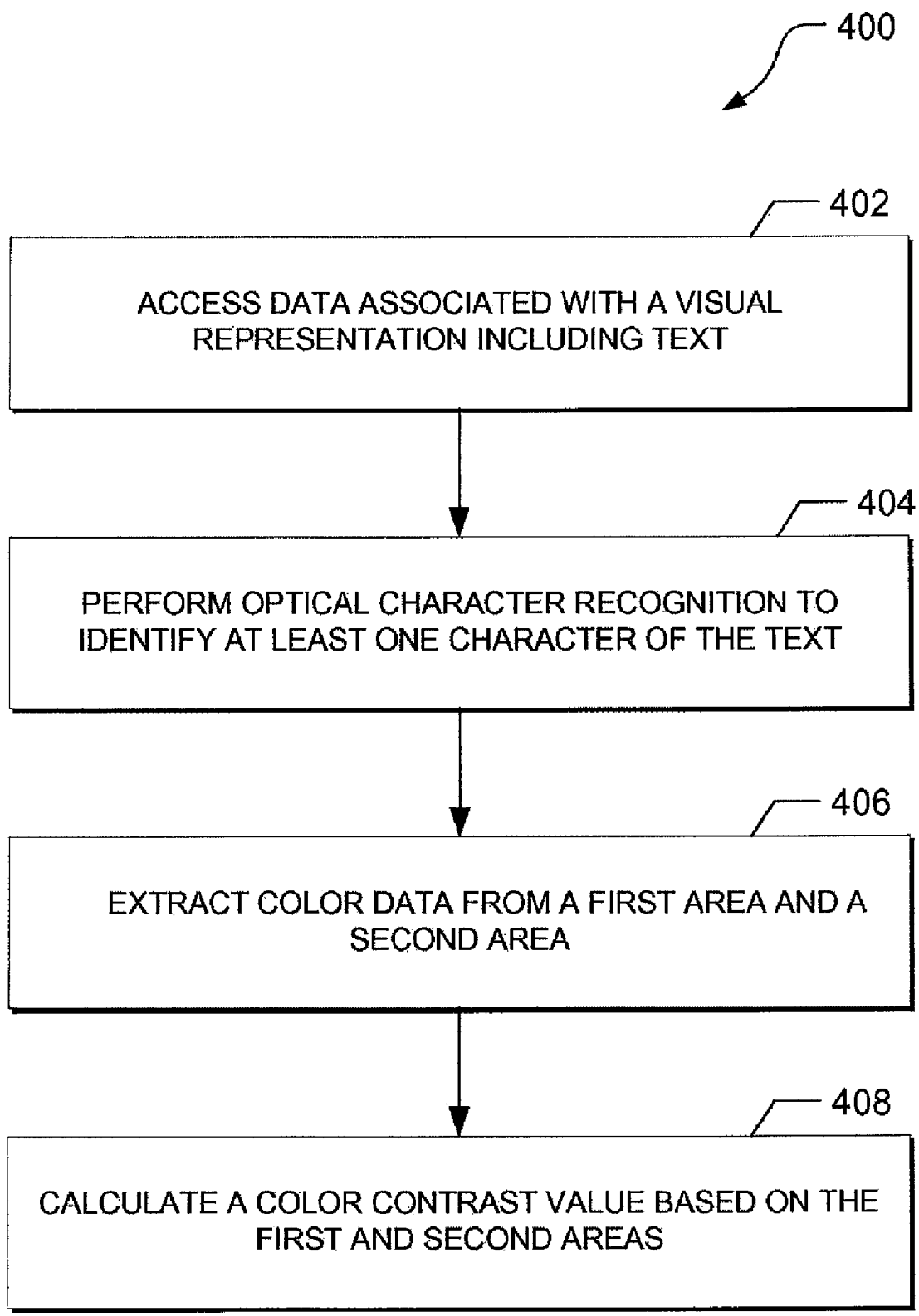
FIG. 4 shows a flow diagram of a general overview of a method, in accordance with an example embodiment, for analyzing color contrast in a visual representation.

Referring to FIG. 4, reference 400 generally indicates a method, in accordance with an example embodiment, for analyzing color contrast in a visual representation. The method 400 may be performed by the apparatus 300 and, accordingly, is described by way of example with reference thereto.

Figure 8:
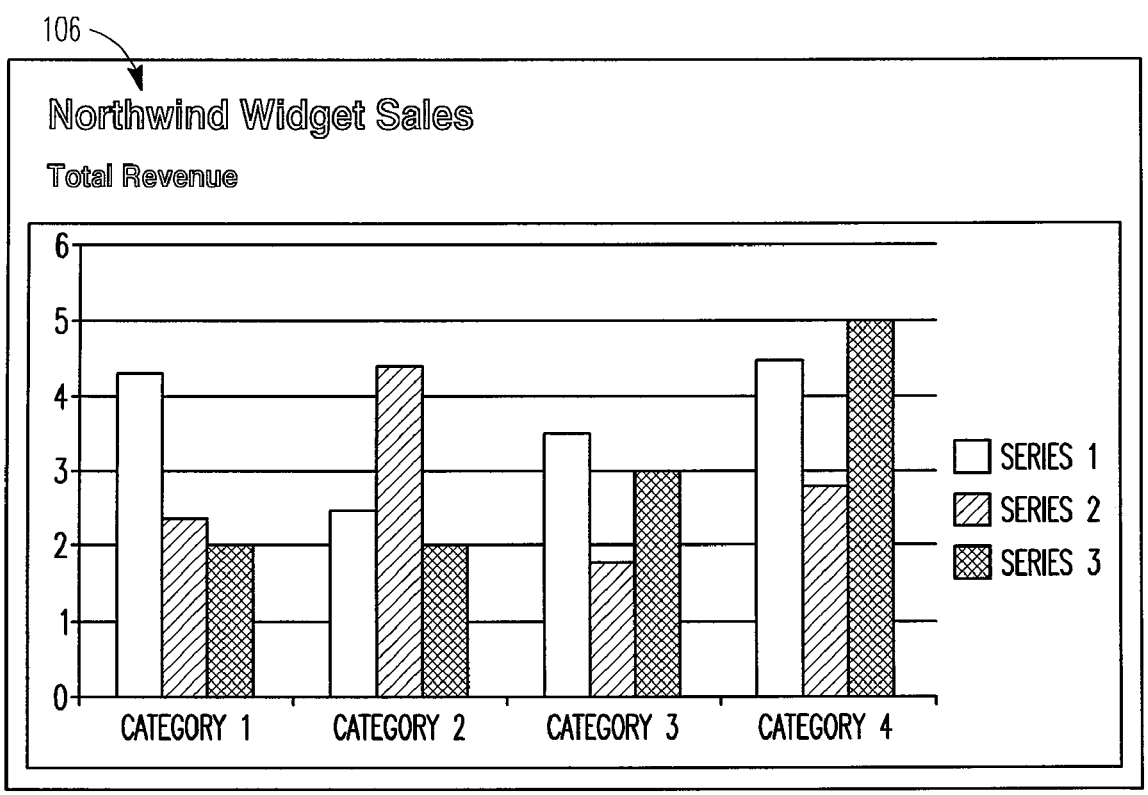
FIG. 8 shows a schematic view of the visual representation of FIG. 1 after optical character recognition has been performed.

When the method 400 is initiated, data associated with a visual representation including text (e.g., the visual representation 100 including the text 106) is accessed as shown at block 402. Thereafter, at block 404 optical character recognition is performed on the visual representation to identify at least one character. For example, with reference to FIG. 1, optical character recognition may be performed on the visual representation 100 to identify at least one character 106.1-106.21 of the text 106. In an example embodiment, all characters constituting the text 106 are identified using optical character recognition. For example, a screenshot of the visual representation may be obtained and, thereafter, optical character recognition may be performed on the screenshot. FIG. 8 shows a schematic view of the visual representation 100 after optical character recognition has been performed on the text 106. For the purposes of this document the term character is intended to include letters (e.g., of any alphabet, English or non-English) as well as numerals. Thus, in an example embodiment, Japanese, Chinese or any other characters may be analyzed and the example embodiments should thus not be construed as being limited to the English language.

After the optical character recognition has been performed, as shown at block 406, color data is extracted from a first area and a second area. The first area forms part of a character 106.1-106.21 and the second area forms part of the background area 108 that is external to the text 106. A color contrast value, or multiple color contrast values, is/are then calculated based on color data extracted from the first and second areas (see block 408). The color contrast value(s) may then be presented to a user to identify if predetermined requirements have been met. For example, a comparison between the calculated color contrast values and those provided in the Web Content Accessibility Guidelines (WCAG) may be performed.

The method 400 may be provided in a standalone software application and/or integrated within another software application. For example, the method 400 may be integrated within software used by software testers, user interface designers, software developers, document authors, report creators, dashboard creators, website creators and the like. User interface designers and developers may use the method 400 to automatically validate a product design without requiring the use of third-party software in a manual copy-and-paste process in different applications. A software testing team may use the method 400 to catch problem areas early in advance during product development. This may save time as opposed to finding these issues at the end of the product development cycle when an accessibility audit is completed.

Figure 5:
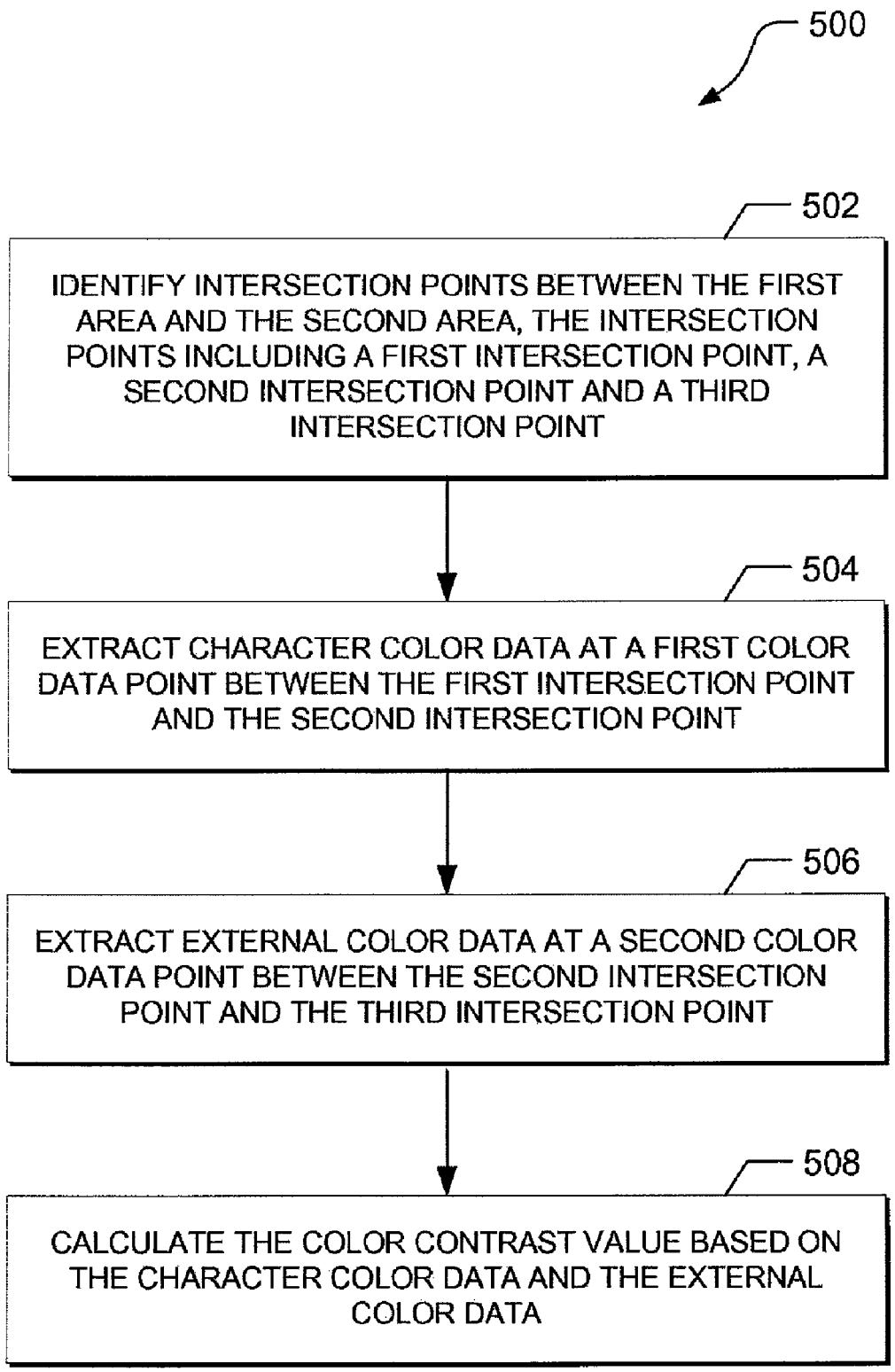
FIG. 5 shows a flow diagram of a general overview of a method, in accordance with an example embodiment, for extracting color data in a visual representation.

FIG. 5 shows a flow diagram of a general overview of a method 500, in accordance with an example embodiment, for extracting color data in a visual representation. The method 500 may, for example, be performed by the operation shown in block 406 of FIG. 4.

As shown at block 502, the method 500 may identify a plurality of intersection points between the first area (e.g., the text 106) and the second area (e.g., the background area 108). The plurality of intersection points may include a first intersection point, a second intersection point and a third intersection point. However, it will be appreciated that any number of intersection points may be identified, and the number of identified intersection points may depend on a length of the text 106 in the visual representation.

Figure 9:
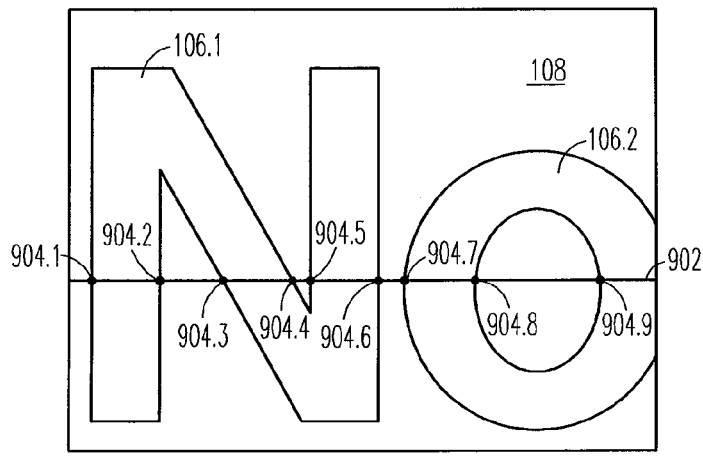
FIG. 9 shows a schematic view of two characters of text from the visual representation wherein intersection points have been identified.

FIG. 9 shows a schematic view of two characters of text 106 from the example visual representation 100 wherein intersection points have been identified. In particular, a horizontal line 902 is selected so that it passes through the text 106. In an example embodiment, line 902 is selected to be about 0.25 to 0.45 em (e.g., about 0.33 em) above a baseline of the characters in text 106. An em is the maximum height of a letter for given font and font size. Accordingly, intersection points 904.1-904.9 arise wherein each intersection point 904.1-904.9 is provided at a border between a character 106.1, 106.2 and the background area 108. It will be appreciated that the border between the characters 106.1 and 106.2 need not necessarily be clearly defined and, accordingly, the intersection points 904.1-904.9 may lie in a border zone between the characters 106.1, 106.2 and the background area 108.

Figure 10:
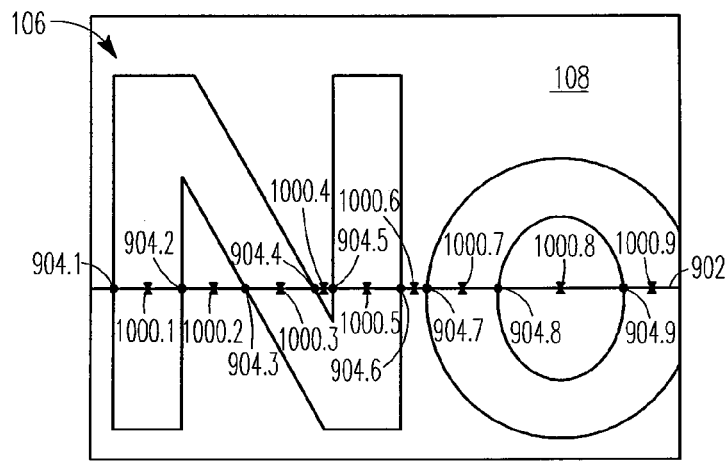
FIG. 10 shows a schematic view of the visual representation of FIG. 9 wherein color data points have been identified based on the intersection points.

FIG. 10 shows a schematic view of the visual representation of FIG. 9 wherein color data points have been identified based on the intersection points 904.1-904.9. In an example embodiment, color data points 1000.1-1000.9 are selected midway between adjacent intersection points 904.1-904.9. The color data points 1000.1, 1000.3, 1000.5, 1000.7 and 1000.9 correspond to character color data and 1000.2, 1000.4, 1000.6 and 1000.8 correspond to external color data.

It is to be appreciated that in other example embodiments, the color data points 1000.1, 1000.3, 1000.5, 1000.7 and 1000.9 may be selected at any point along the line 902 provided that they fall within the area occupied by the characters 106.1 and 106.2. Likewise, the color data points 1000.2, 1000.4, 1000.6 and 1000.8 may be located at any point along the line 902 provided they are located in the background area 108.

Figure 11:
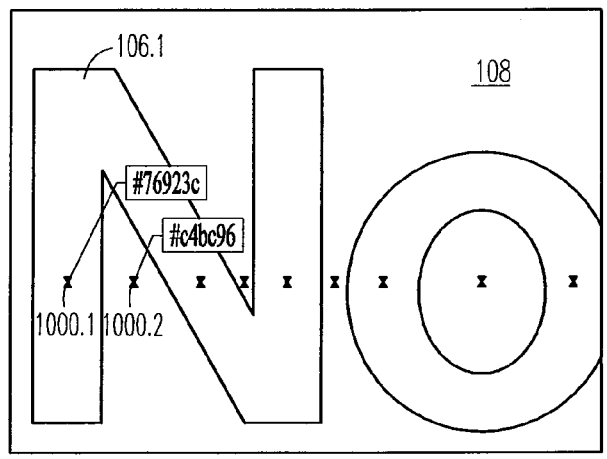
FIG. 11 shows a schematic view of example hexadecimal values taken at the color data points shown in FIG. 10.

In order to calculate color contrast values, the operations of extracting character color data (blocks 504 and 506 in FIG. 5) may include obtaining hexadecimal color values (e.g., a hexadecimal triplet) at each color data point. The hexadecimal triplet may include a first byte providing a red value, a second byte providing a green value, and a third byte providing a blue value. The numerical value of the byte may range from 00-FF for each color component, thus allowing a maximum number of 16,777,216 colors (256×256×256). FIG. 11 shows a schematic view of example hexadecimal values taken at the color data points 1000.1 and 1000.2. A hexadecimal value "76923C" is shown by way of example to correspond to color data from the character 106.1, and a hexadecimal value "C4BC96" is shown by way of example to correspond to color data from the background area 108.

Figure 6:
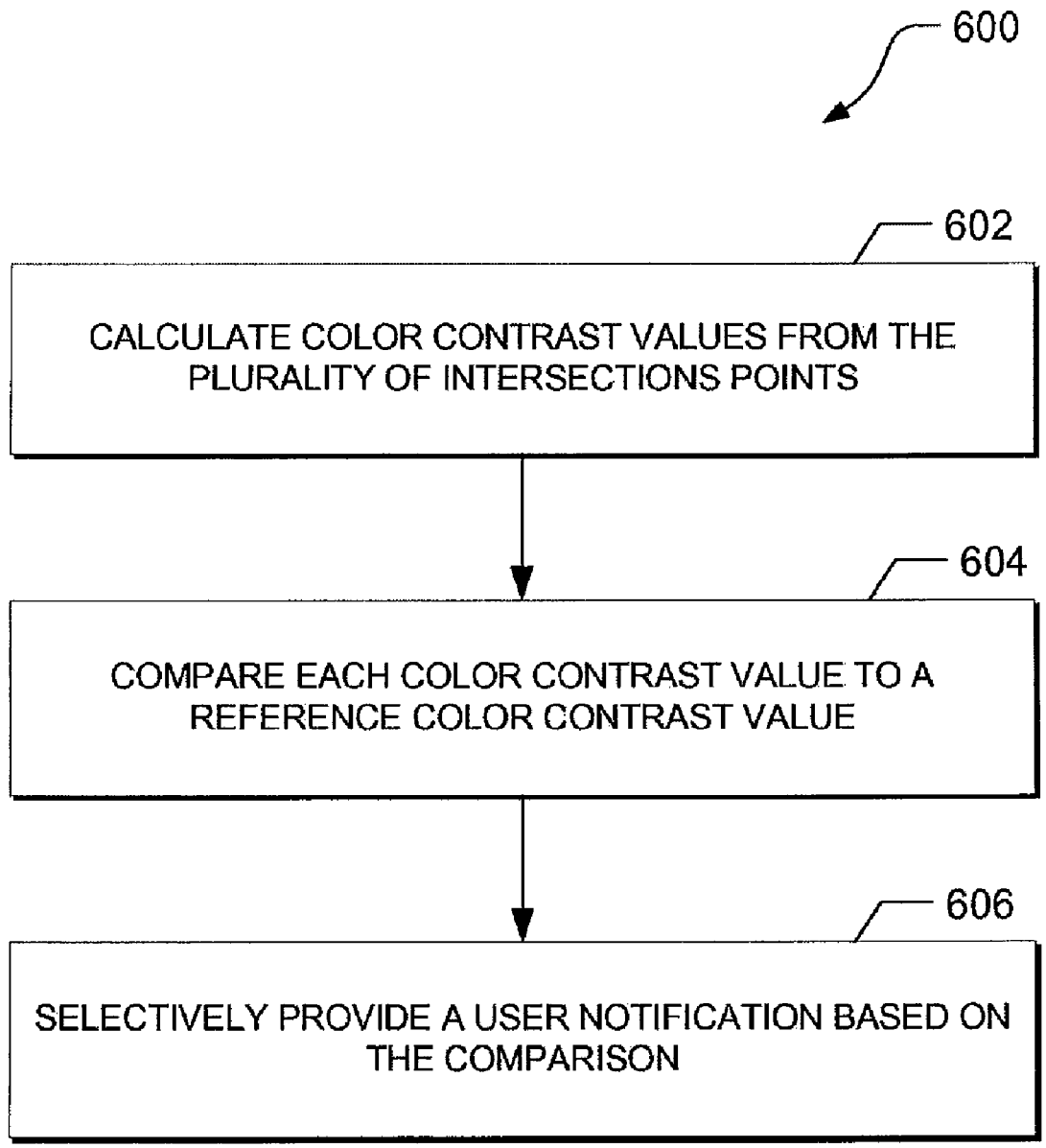
FIG. 6 shows a flow diagram of a general overview of a method, in accordance with an example embodiment, for providing a user notification based on color contrast values in the visual representation.
Figure 12:
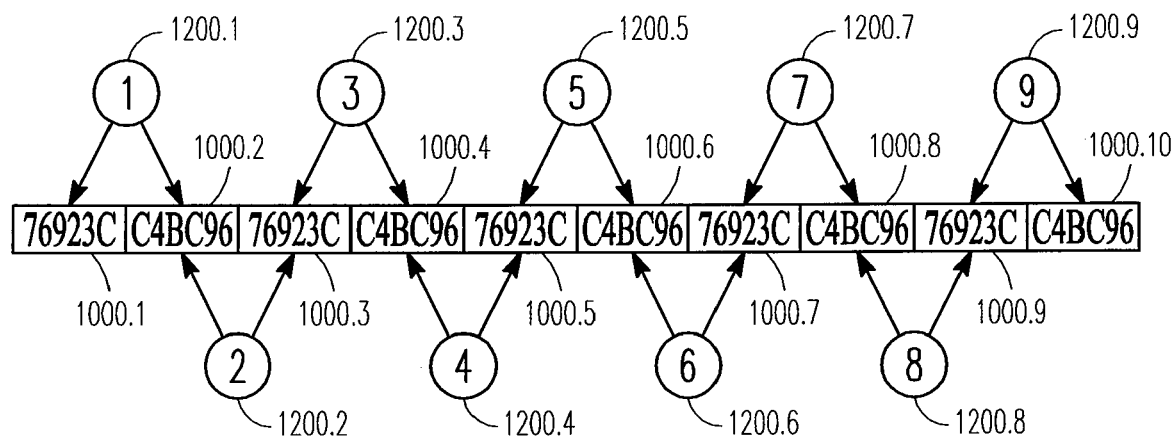
FIG. 12 shows a schematic view of example contrast values calculated from adjacent color data points.

FIG. 12 shows a schematic view of example contrast values calculated from adjacent color data points. The example color contrast values may be calculated using the method 600 shown in FIG. 6. In particular, the method 600 may automatically provide a user notification based on color contrast values in the visual representation. As shown at block 602, a plurality of color contrast values may be calculated from the plurality of intersections points. Thereafter, each color contrast value of the plurality of color contrast values may be compared to a reference color contrast value (see block 604). Based on an outcome of the comparison, in block 606 a user notification may be selectively provided based on the comparison. For example, selectively providing the notification may include indicating that one or more color contrast values meet reference requirements, indicating that one or more color contrast values do not meet reference requirements, providing a red flag/highlight, providing a green flag/highlight, etc.

As shown in FIG. 12, a plurality of color contrast values 1200.1-1200.9 may calculated using color data from adjacent color data points. For example, the color contrast value 1200.1 may be calculated from the character color data extracted at color data point 1000.1 and the external color data extracted at color data point 1000.2. Thus, in an example embodiment, an array of color values may be used to analyze the color contrast between text 106 and the background area 108. In an example embodiment, each color contrast value in the array (e.g., color contrast values 1200.1-1200.9) may be calculated with reference to a next value in the array using a method for finding color contrast such as the method published in WCAG 2.0 draft (e.g., see below). In an example embodiment, the calculations are performed repetitively until the end of the array is reached. The calculations may however be terminated when any one of the calculated color contrast values does not meet a required color contrast reference value.

Color contrast is part of the WCAG 2.0 guidelines 1.4.3 and 1.4.5. It is also part of the U.S. Rehabilitation Act of 1973 at Section 508 in §1194.21(j) and ISO Standard ISO-9241 at part 3, from International Organization for Standardization (ISO), Geneva, Switzerland. WCAG 2.0 guidelines 1.4.3 and 1.4.5 provide as follows:

WCAG 2.0 Guideline 1.4.3: Contrast (Minimum): Text (and images of text) have a contrast ratio of at least 5:1, except if the text is pure decoration. Larger-scale text or images of text can have a contrast ratio of 3:1.

WCAG 2.0 Guideline 1.4.5: Contrast (Enhanced): Text (and images of text) have a contrast ratio of at least 7:1, except if the text is pure decoration. Larger-scale text or images of text can have a contrast ratio of 5:1.

In an example embodiment, the method 400 as shown in FIG. 4 may use text objects to perform a color contrast analysis. For example, the operation in block 402 may include automatically capturing a screenshot of a visual representation (e.g., a report or the entire screen). Then, using known edge detection and text detection techniques, the operation in block 404 may provide a mapping of all text objects in the visual representation. The edge detection technique may include, but not be limited to, a predefined list of font families to enhance the accuracy of edge detection. Further to the operation shown in block 406, the mapped text elements may have their text color and background color automatically sampled by an application using the method 400. In an example embodiment, the application may select a new color based on the existing color at a color data point between intersection points. This may, in an example embodiment, reduce inaccuracies introduced by font smoothing display options used by a client application or operating system. The colors adjacent the intersection points may then be sampled to identify a background color.

In an example embodiment, using the hexadecimal color data values (see FIGS. 11 and 12), the color contrast values may be calculated using the General Technique 18 (G18), as set out in the WCAG 2.0 guideline 1.4.3 and 1.4.5:

1. Measure the relative luminance of each letter (unless they are all uniform) using the formula:

$L=0.2126*R+0.7152*G+0.0722*B$ where $R, G$ and $B$ are defined as:

if $R_{sRGB}<=0.03928$ then $R=R_{sRGB}/12.92$ else $R=((R_{sRGB}+0.055)/1.055)^{2.4}$ if $G_{sRGB}<=0.03928$ then $G=G_{sRGB}/12.92$ else $G=((G_{sRGB}+0.055)/1.055)^{2.4}$ if $B_{sRGB}<=0.03928$ then $B=B_{sRGB}/12.92$ else $B=((B_{sRGB}+0.055)/1.055)^{2.4}$ and $R_{sRGB}$, $G_{sRGB}$, and $B_{sRGB}$ are defined as:

$R_{sRGB}=R_{8bit}/255$ $G_{sRGB}=G_{8bit}/255$ $B_{sRGB}=B_{8bit}/255$

Note: The "^" character is the exponentiation operator.

2. Measure the relative luminance of the background pixels immediately next to the letter using same formula.

3. Calculate the contrast ratio using the following formula: (L1+0.05)/(L2+0.05), where L1 is the relative luminance of the lighter of the foreground or background colors, and L2 is the relative luminance of the darker of the foreground or background colors.

4. Check that the contrast ratio is equal to or greater than 5:1, 7:1 or some other value depending on the standard applied.

(See http://www.w3.org/TR/2007/WD-WCAG20-TECHS-20070517/Overview.html#G18, which is incorporated by reference into this description.)

It will be appreciated that color contrast values may be calculated by techniques other than G18 or modification of G18. This includes variations of the correct techniques as law, accepted practices and/or understanding of vision changes overtime.

Figure 13:
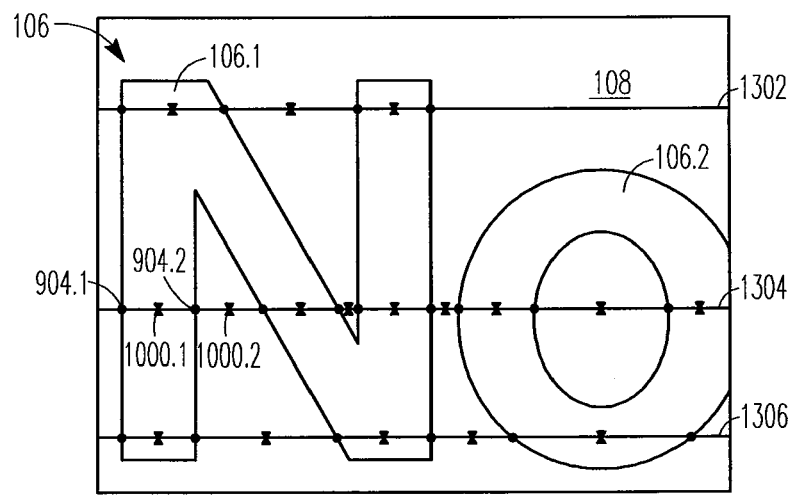
FIG. 13 shows a schematic view of the visual representation of color data points selected to lie along three parallels lines extending through characters of the text.

FIG. 13 shows a schematic view of a visual representation of color data points selected to lie along three parallel lines 1302, 1304 and 1306 extending through example characters 106.1 and 106.2 of the text 106. The methodology to determine intersection points between the characters 106.1 and 106.2 and the background area 108 may be the same, or substantially similar, to the methodology as herein before described with reference to FIG. 9. Thus, in an example embodiment, color contrast values may be calculated along at least two spaced-apart lines extending through characters 106.1 and 106.2 in the text 106. Thereafter, each color contrast value selected along each line 1302, 1304, 1306 is compared to an adjacent color contrast value (see FIG. 12) to determine if the color contrast between the text 106 and the background area 108 meets a reference contrast value. The spacing of the parallel lines may be selected so that an area proximate the top of the characters 106.1 and 106.2 and the bottom of the characters 106.1 and 106.2 is analyzed. In the example shown in FIG. 13, line 1306 is selected to be about 0.1 em above a baseline of the characters 106.1 and 106.2 and line 1302 is selected to be about 0.9 em above the baseline. The placement of the parallel lines may vary from one font to another font. In another example embodiment, not shown, the parallel lines are selected to be 0.1 and 0.8 em above the baseline.

A user notification may be provided if any one of the color contrast values selected along the lines 1302, 1304 and 1306 do not meet the reference contrast value. Optionally determining the color contrast values along multiple lines extending through the text 106 may allow a creative designer to enhance the overall readability of digital media.

Figure 14:
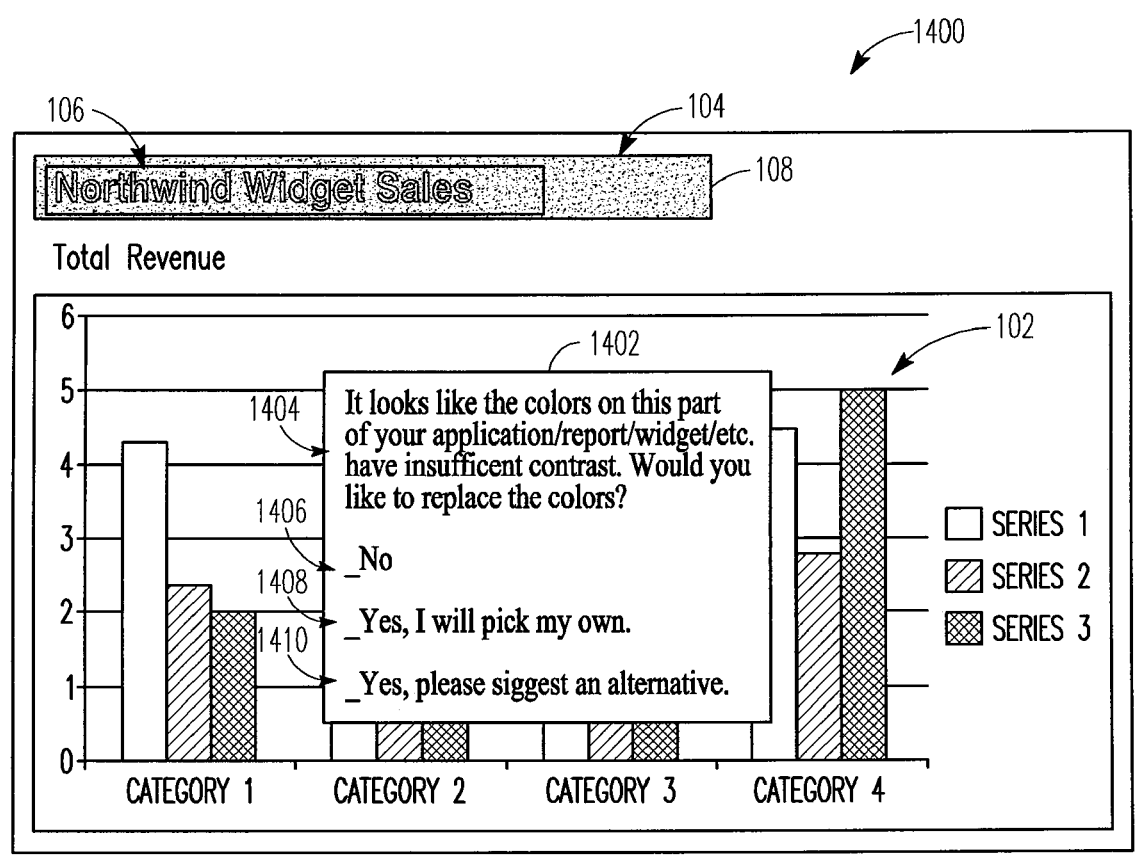
FIG. 14 shows a schematic view of a graphical user interface (GUI), in accordance with an example embodiment, for displaying color contrast information and receiving a user input.

FIG. 14 shows an example GUI 1400 to provide a user with an indication of color contrast values in a visual representation. The GUI 1400 is shown by way of example to correspond with the visual representation 100 and, accordingly, like reference numerals have been used to indicate the same or similar features.

In the example GUI 1400, an example dialogue box 1402 is shown to inform the user of color contrast values in a selected area. For example, the user may use a mouse or keyboard to identify a particular area for analysis. In the example GUI 1400, it is assumed that the user has selected the display area 104 including the text 106 and the background area 108. When the color contrast between the text 106 and the background area 108 does not meet a reference color contrast value, the dialogue box 1402 provides a narrative 1404 advising the user that the color contrast values do not meet the reference color contrast value. In an example embodiment, the user is also provided with a plurality of options which may be selected. For example, an option is provided not to replace the color contrast values even though the analysis has shown that they do not meet the reference color contrast value (see selection 1406); an option is provided for the user to select his/her own color contrast values (see selection 1408); and an option is provided for the application to automatically provide or suggest color contrast values that meet the predefined reference color contrast values (see selection 1410). In an example embodiment, the GUI 1400 may be generated by the method 600 shown in FIG. 6.

It will be appreciated that various different dialogue boxes, or any other techniques, may be used in the GUI 1400 to communicate to a user that the color contrast values do not meet the reference color contrast value(s). For example, a text highlighting feature or pop-up balloon or any other visual indicator may be provided to the user.

Figure 7:
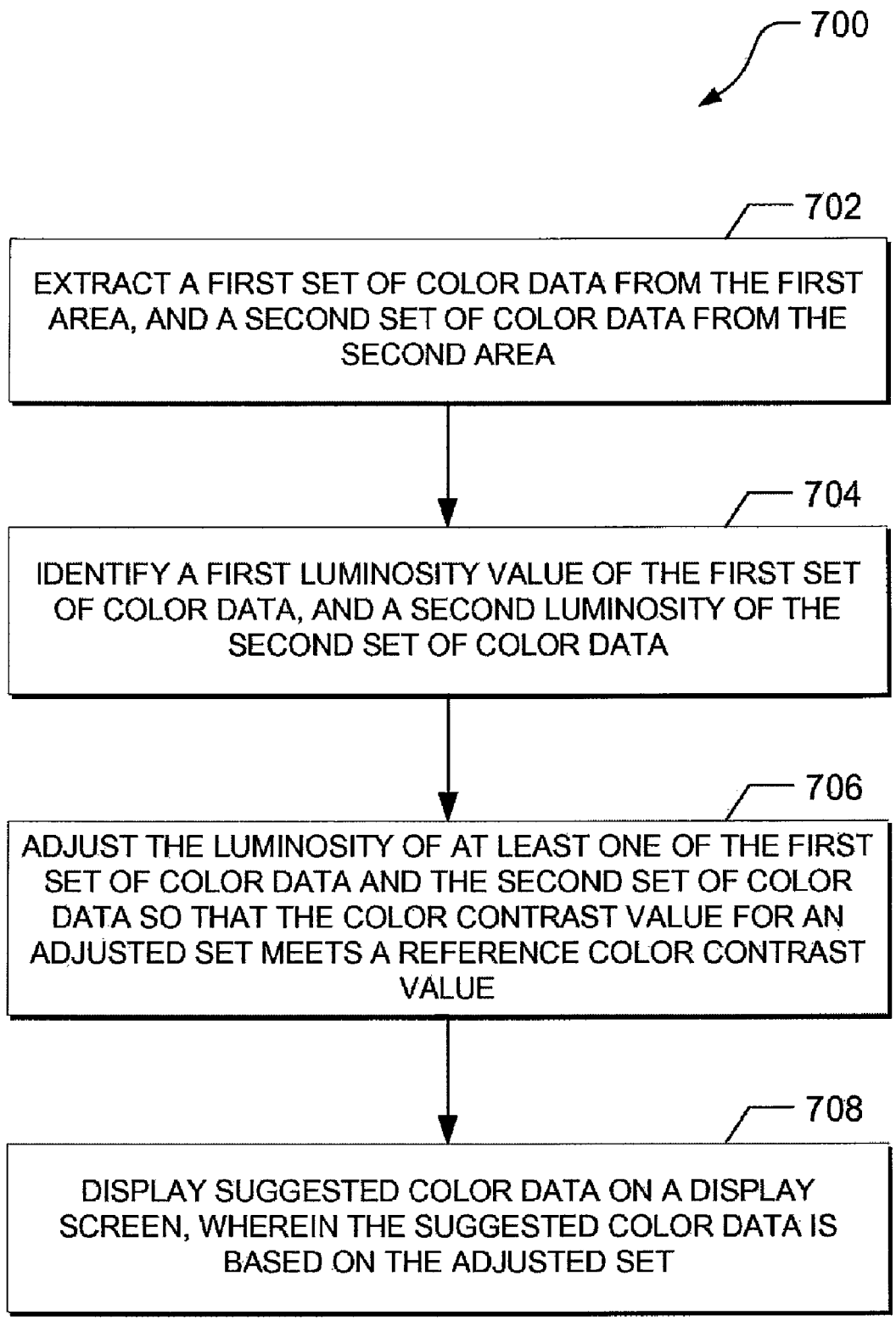
FIG. 7 shows a flow diagram of a general overview of a method, in accordance with an example embodiment, for suggesting modified luminosity values.

FIG. 7 shows a flow diagram of a general overview of a method 700, in accordance with an example embodiment, for suggesting modified luminosity and saturation intensity values of the color of the text 106 and/or the background area 108. For example, the method 700 may be initiated when the user chooses the selection 1410 in the GUI 1400. The method 700 may be performed in conjunction with the methods 400 and 500.

As shown at block 702, the method 700 may include extracting a first set of color data from the first area (e.g., the text 106) and a second set of color data from the second area (e.g., the background area 108). Thereafter, as shown at block 704, a first luminosity value of the first set of color data may be identified, and a second luminosity of the second set of color data may be identified. The luminosity of at least one of the first set of color data and the second set of color data may then be adjusted so that the color contrast value for the adjusted set meets a reference color contrast value (see block 706). Suggested color data, based on the adjusted set, may then be displayed on a display screen of a computer monitor (see block 708).

Figure 15:
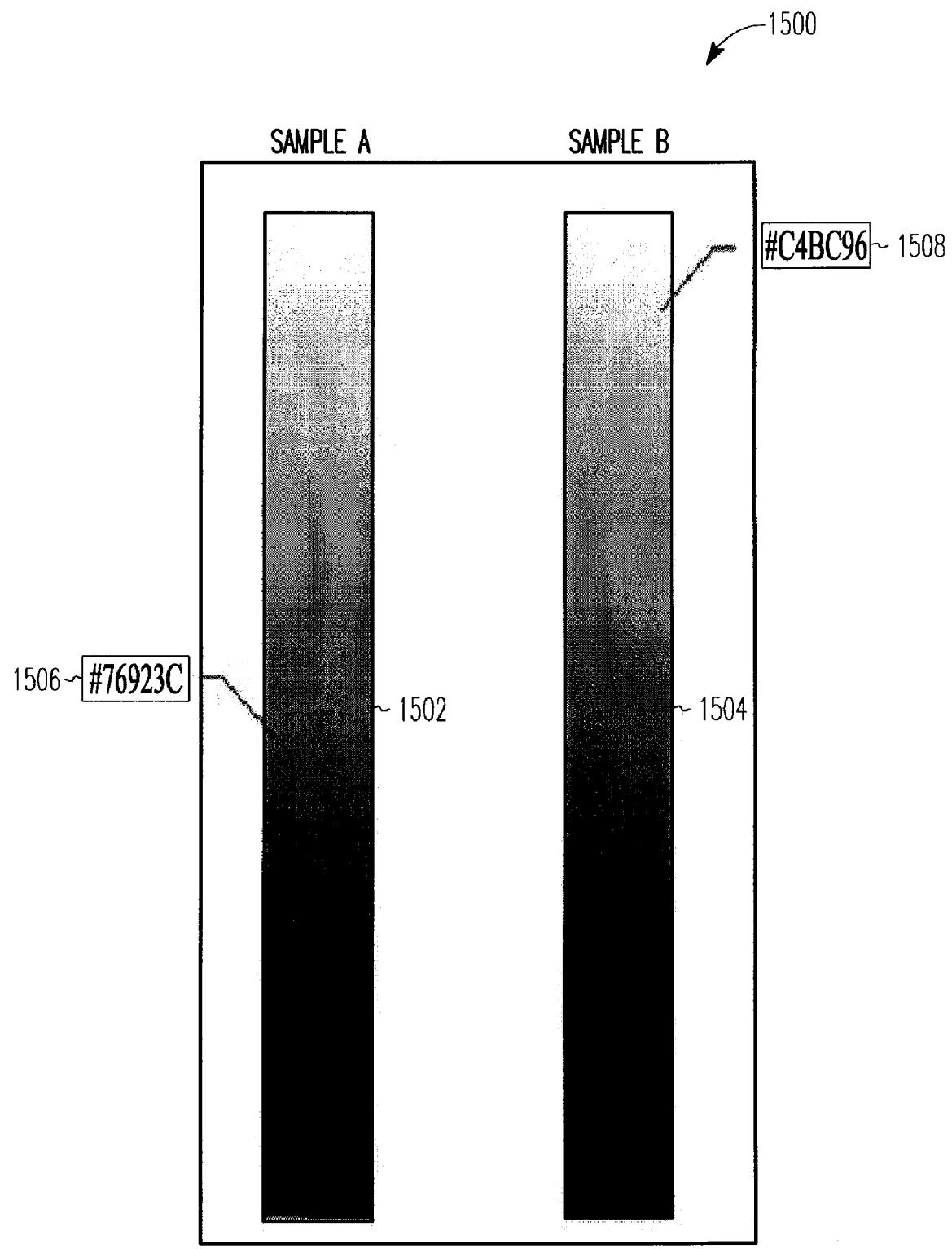
FIGS. 15-17 show schematic views of example GUIs for displaying suggested color contrast corrections.

FIG. 15 shows a schematic view of an example GUI 1500 that provides two sample color strips 1502 and 1504 for providing color suggestions to enhance a color contrast ratio. The GUI 1500 is shown, by way of example, to correspond to the character color data (76923C) extracted at color data point 1000.1 and the external color data (C4BC96) extracted at the external color data point 1000.2. It will be appreciated that the color data may be extracted automatically using one or more operations methods 400, 500, 600 and 700. The GUI 1500 may provide color data extracted from the visual representation 100 and, accordingly, is described by way of example with reference thereto.

Based on the color data extracted (e.g., 76923C and C4BC96), color strips 1502 and 1504 may be displayed. The relative position of the extracted data may be shown on each color strip 1502 and 1504. If the hexadecimal value of the color data 1506 (corresponding to text color data) is greater than the hexadecimal value of the color data 1508 (corresponding to external color data), then a document creator may be prompted to change the selected color of the text 106 so that it is darker than the selected color for the background area 108. In an example embodiment, the GUI 1500 may provide a slider that a user can manipulate with a mouse and/or keyboard to select new color data values for the representation. Accordingly, the color data values may be adjusted so that color contrast values meet reference color contrast values.

Figure 16:
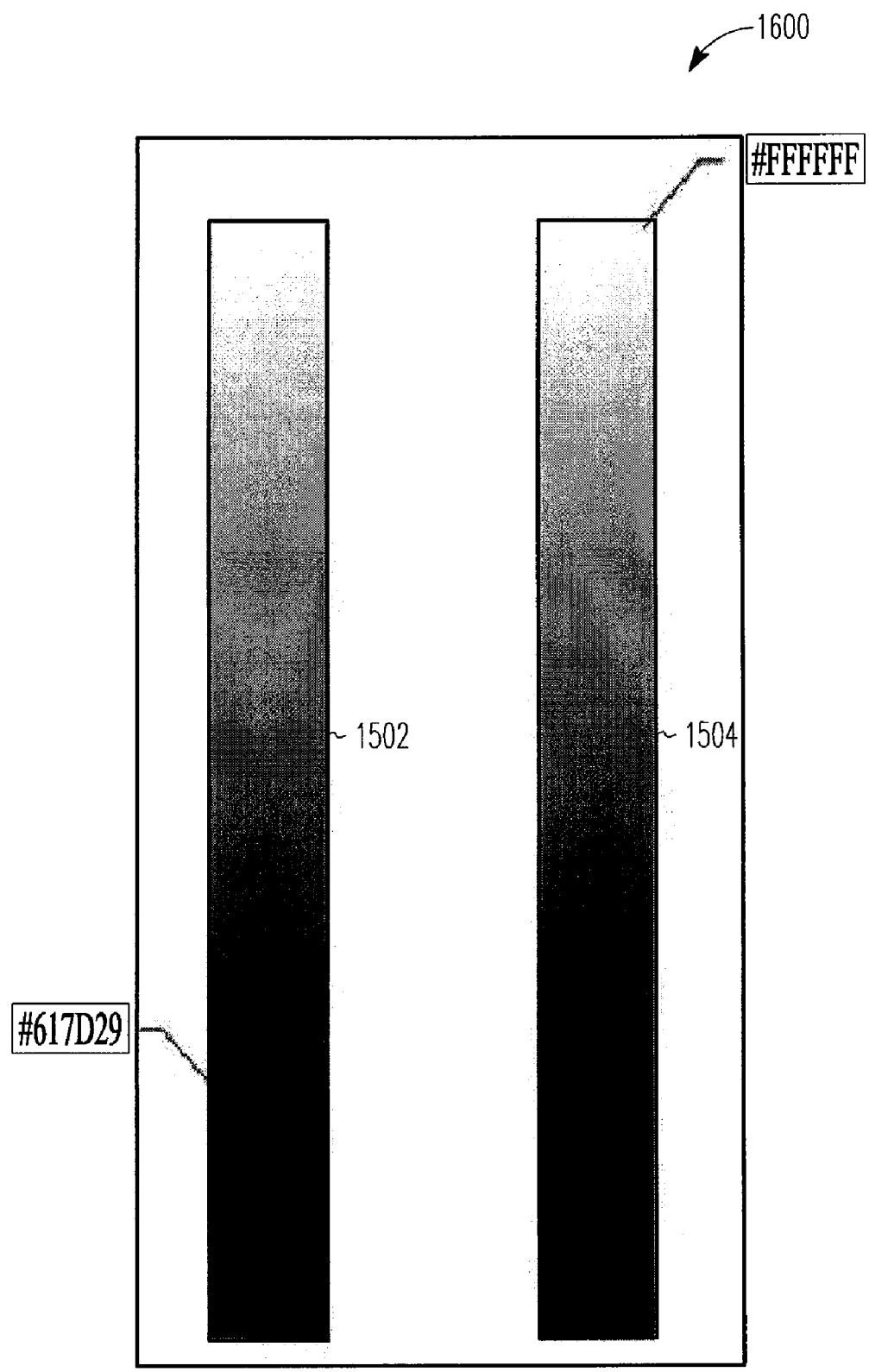

FIG. 16 shows an example GUI 1600 providing a suggested color (corresponding to color data 617D29) for the text 106 so that the required color contrast between the text 106 and the background area 108 is met. The suggested color may be determined based on luminosity adjustments. In an example embodiment, the hues of the colors may not change. For example, the colors may be separated in darkness until there is sufficient contrast between the text 106 and the background area 108 (see block 706 in FIG. 7).

Figure 17:
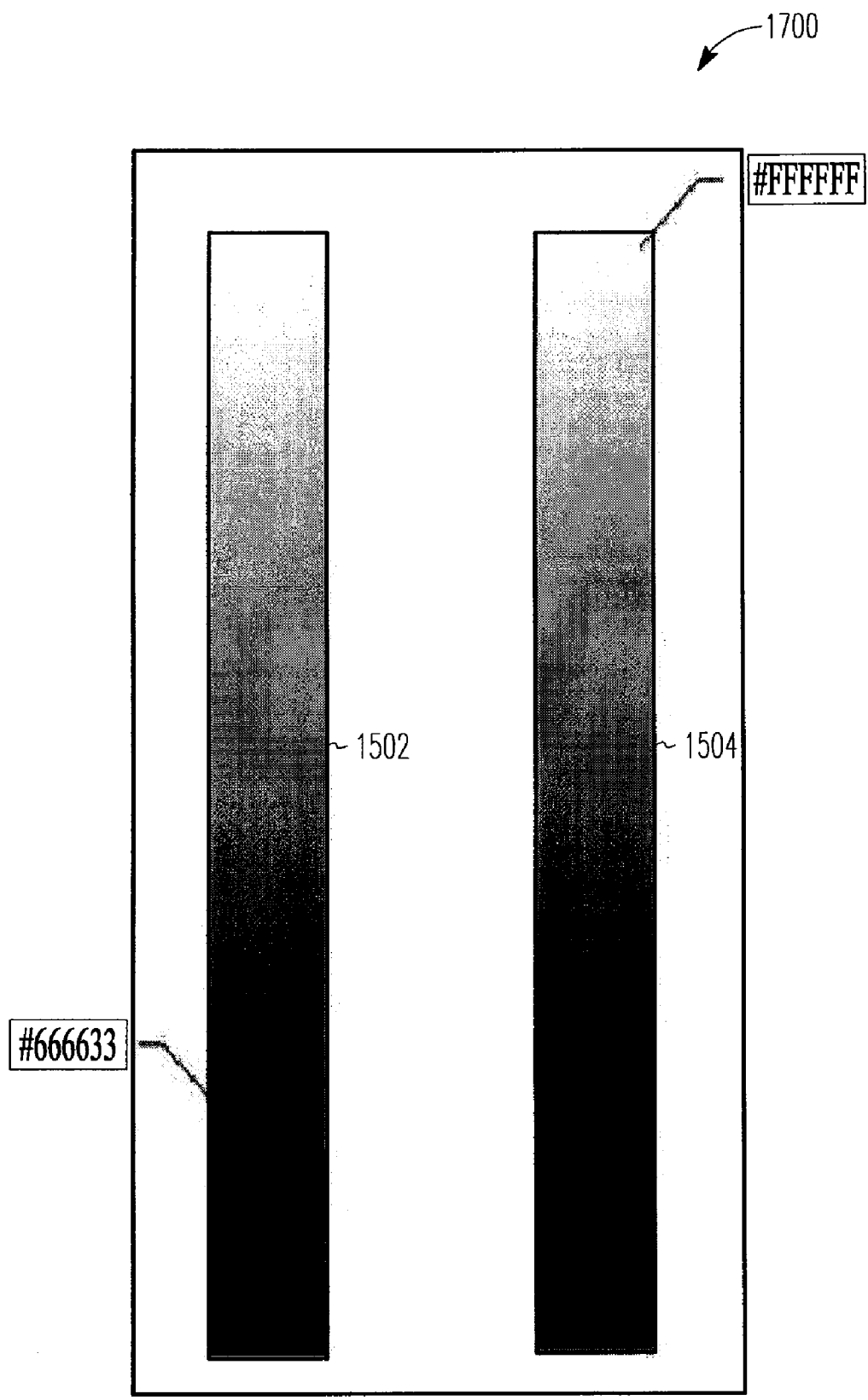

In an example embodiment, when the methods 400, 500, 600 and/or 700 are used when creating documents for a web environment, the adjusted colors may be rounded off to a nearest "web safe color". Web safe colors are hexadecimal triplets consisting of hexadecimal numbers selected from 00, 33, 66, 99, CC, and FF. Accordingly, instead of the example color value 617D29 suggested in the GUI 1600 (see FIG. 16), a web safe color value 666633 may be used in the visual representation 100. In this example embodiment, a hue shift may occur. Accordingly, a GUI 1700 (see FIG. 17) may be provided to show a nearest web safe color to a document creator.

Figure 18:
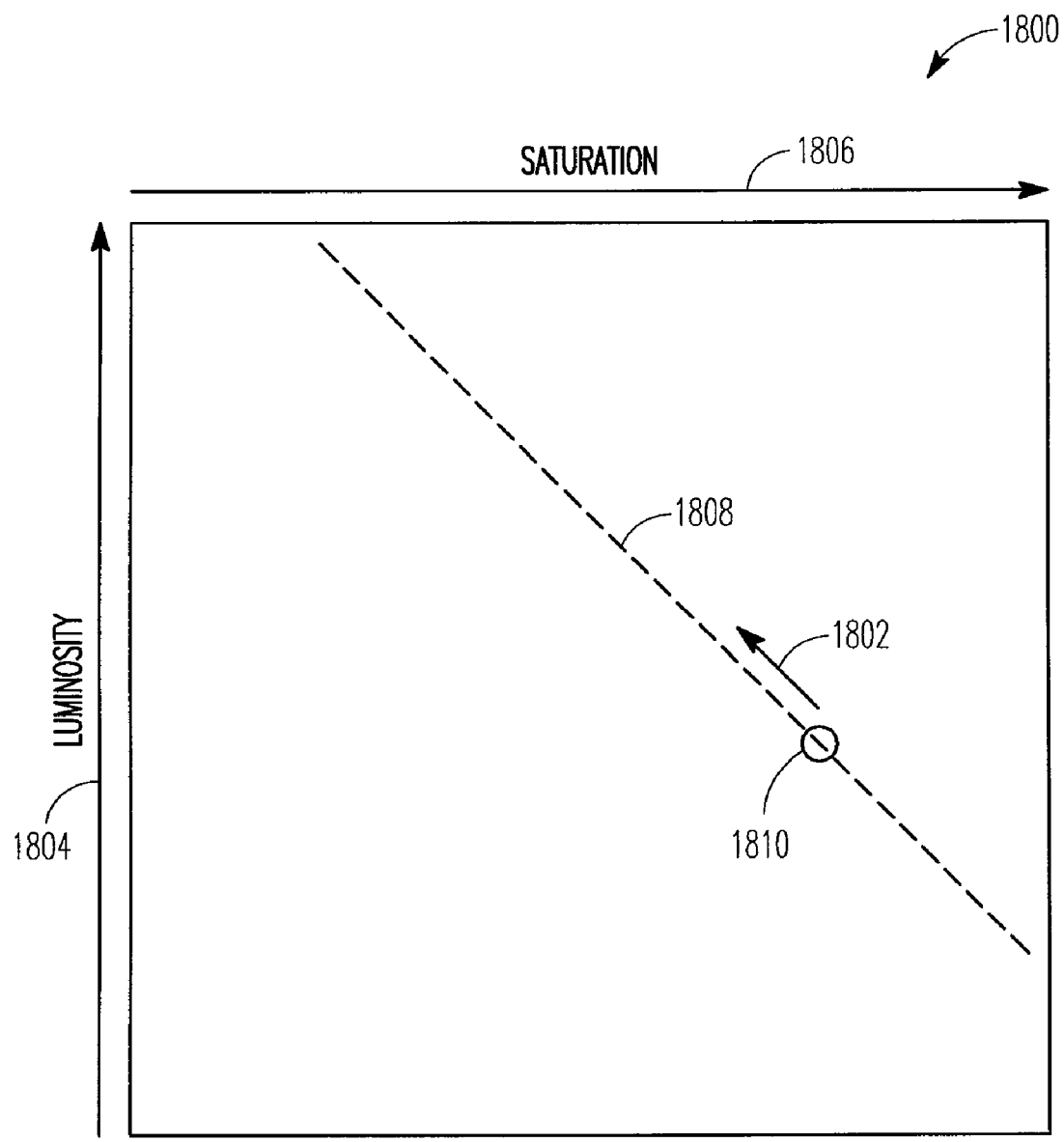
FIG. 18 shows a schematic view of a GUI, in accordance with an example embodiment, for displaying suggested color shifting.

FIG. 18 shows an example graph 1800 of a color shifting that may be performed to enhance the color contrast ratio between the text 106 and the background area 108 by color shifting. Using the example color with hexadecimal value 76923C shown in FIG. 15, a color shift from the color with hexadecimal value 76923C to a color with a hexadecimal value of 617D29 may occur in the Hue Saturation Brightness (HSB) and Hue Saturation luminance (HSL) color space. HSL and HSV are two related representations of points in an RGB color space, which attempt to describe perceptual color relationships more accurately than RGB, while remaining computationally simple.

As shown by arrow 1802, the saturation 1806 and the luminosity 1804 may be adjusted so that the adjusted color traverses a color shift line 1808. Thus, the color shift may be performed without changing the intensity of the color and thus making the color brighter or blacker. In the example graph 1800 a circle 1810 is shown to represent a selected area on which a color contrast analysis has been performed using the methods 400, 500, 600 and/or 700.

For example the color with the hexadecimal value (76923C)$_{RGB}$ corresponds to a color (79.53, 58.9%, 57.25%)$_{HSL}$. In an example embodiment where the method determines that, for example, the color of the text 106 needs to be darker, saturation may be increased (e.g., saturation may be increased by 1%) and luminosity may be decreased by 1%. That is, in an example embodiment, the color is adjusted with a change to the saturation that is the opposite of the change to the luminosity. Accordingly, the adjusted color may move in the direction 1808 along the color shift line 1802. In an example embodiment, the luminance and the saturation may be adjusted until the color contrast between the text 106 and the background area 108 meets a required value. In the example color shown in FIG. 16 the hexadecimal color value of (617D29)$_{RGB}$ may be derived from (79.53, 67%, 49%)$_{HSL}$.

Figure 19:
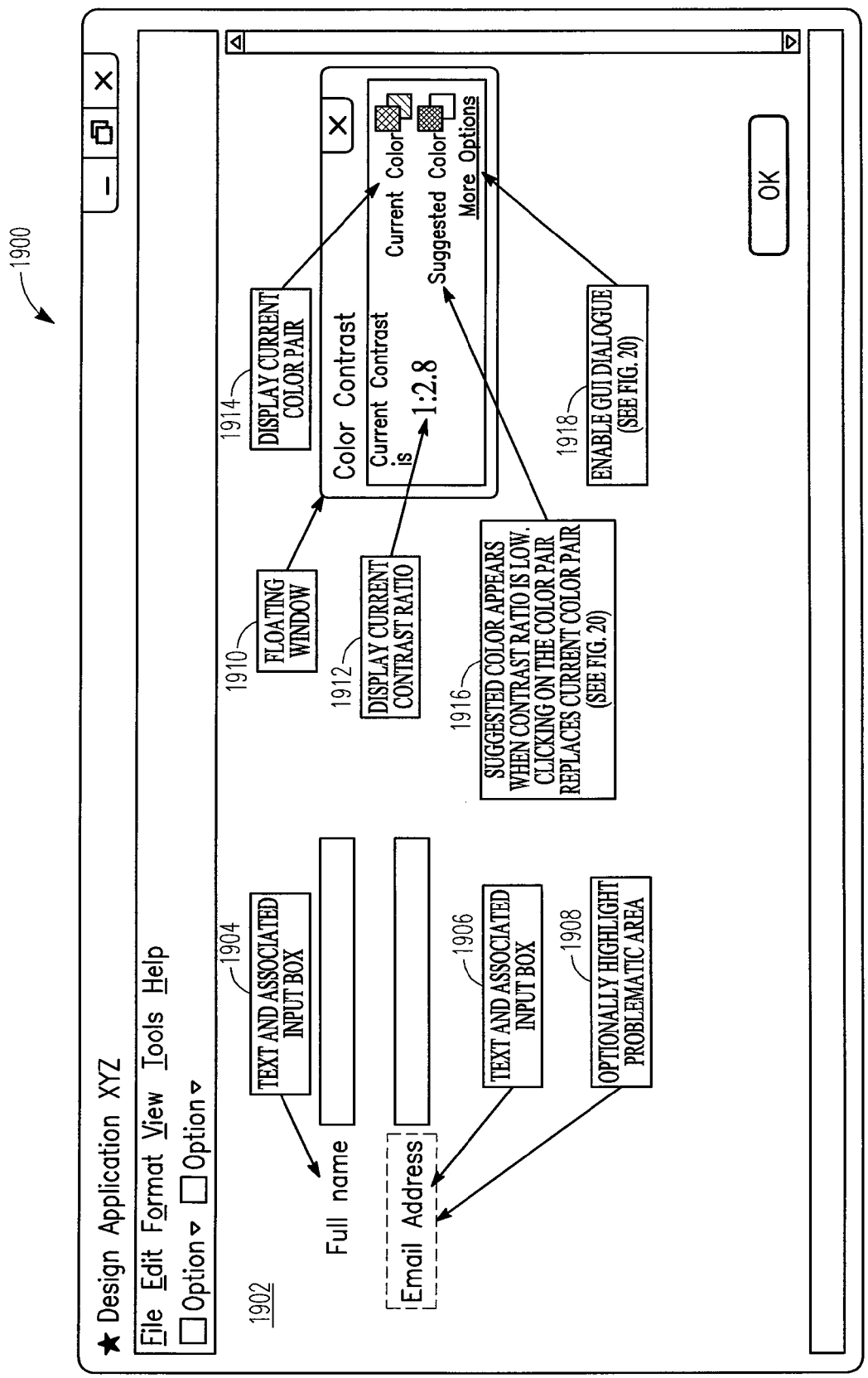
FIG. 19 shows a schematic view of a GUI, in accordance with an example embodiment, for displaying and correcting a color contrast value.

FIG. 19 shows a schematic view of a GUI 1900 for constructing a user interface while analyzing and correcting color contrast values. Some example embodiments could be used to review a completed user interface or a user interface under construction to determine color contrast. The GUI 1900 includes various windows, icons, menus and text to create a user interface 1902 including one or more visual objects. The user interface 1902 is shown by way of example to include visual objects in the form of two text objects 1904 and 1906. The color contrast of the text objects 1904, 1906 can be evaluated at creation of the user interface 1902 or subsequently upon request (e.g., during a post-creation evaluation). The color contrast of the one or more visual objects may be compared to a background area in proximity to each of the visual objects of the in interface 1902. For example, if the text object 1904, 1906 has a low color contrast, optionally, it may be included in a highlighted area 1908. In an example embodiment, the color contrast values are displayed automatically in a floating window 1910. A value 1912 displayed in the window 1910 may be the color contrast for a selected visual object. For example, the text object 1906 in a highlighted area 1908 may have an insufficient contrast from the background color proximate the text object 1906. A current color pair 1914 may be displayed in the window 1910. A suggested color pair 1916 is shown by way of example to be displayed below. In an example embodiment, a designer can accept the suggested color pair by clicking on an associated icon or editing the replacement by clicking on a link 1918. The graphic designer may receive a continual indication of whether or not the media being created complies with the standard acceptable levels of color contrast. These include highlighting offending objects, having warning bubbles attached to these objects, and the like.

Figure 20:
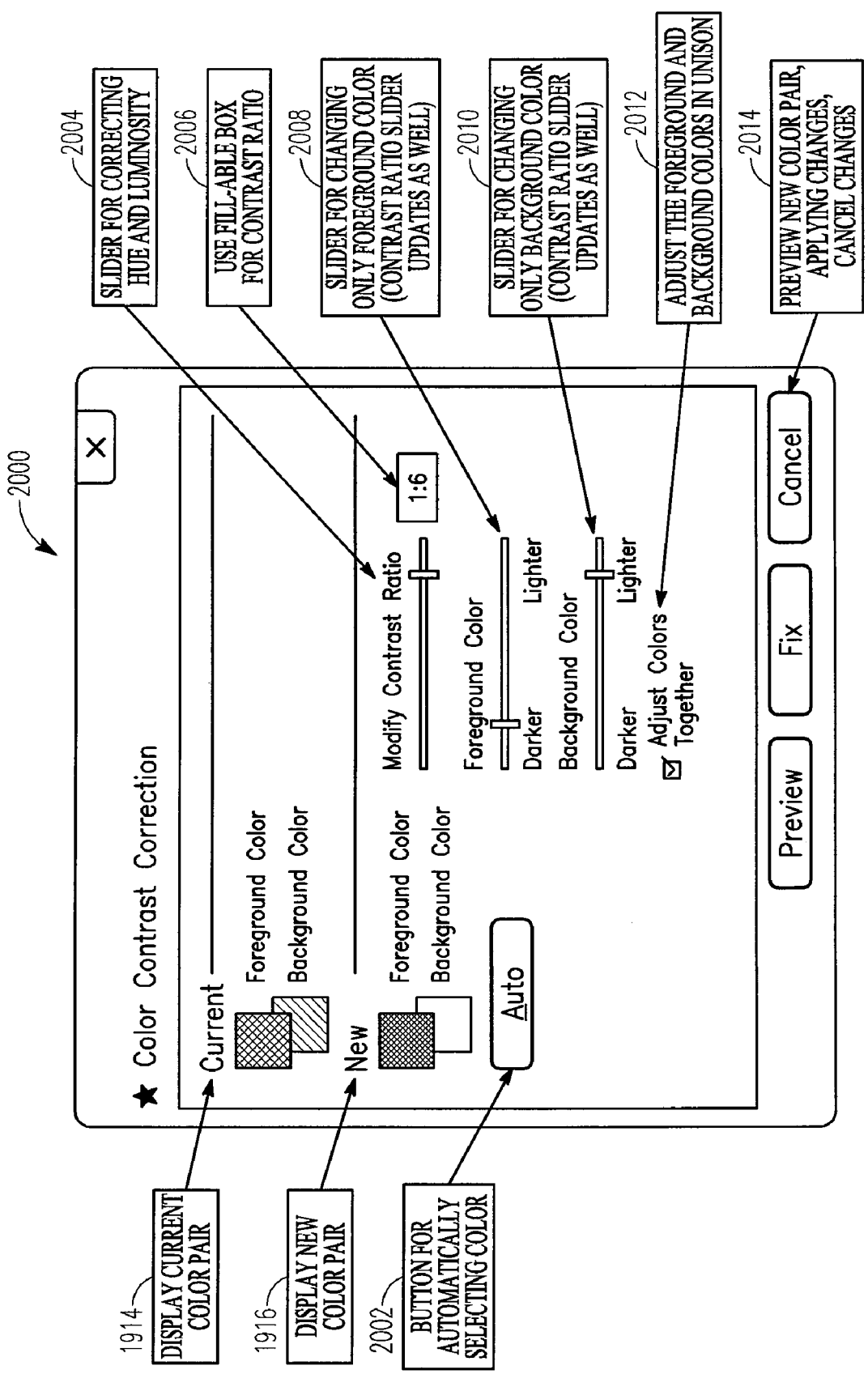
FIG. 20 shows a schematic view of a GUI, in accordance with an example embodiment, for correcting a color contrast value.

FIG. 20 shows a schematic view of a GUI 2000, in accordance with an example embodiment, for correcting a color contrast value. The GUI 2000 can be invoked by clicking on link 1918 of the window 1910. The GUI 2000 includes the current color pair 1914 for an object and its background. The suggested color pair 1916 is shown below. When activated, an automatic button 2002 automatically selects the suggested color. A contrast slider 2004 is provided for adjusting the color contrast of the suggested color pair. Alternatively, or in addition, the designer can enter a color contrast value in a data entry field 2006. In an example embodiment, a slider 2008 is provided to adjust the color of the visual object (e.g., the visual object 1904). A corresponding slider 2010 may be provided for the color of the background to the visual object. In an example embodiment, by selecting a check box 2012 a single slider (not shown) is provided to allow the user to adjust these colors simultaneously. Accordingly, moving the single slider has the effect of moving the sliders 2008 and 2010 simultaneously. This single slider, not shown, may dictate the average position of the suggested colors on the color shift line 1808. The contrast slider 2004 may determine the separation of the two colors on the same line. Buttons 2014 allow the user to preview, accept and cancel the selection of a suggested color pair.

Figure 21:
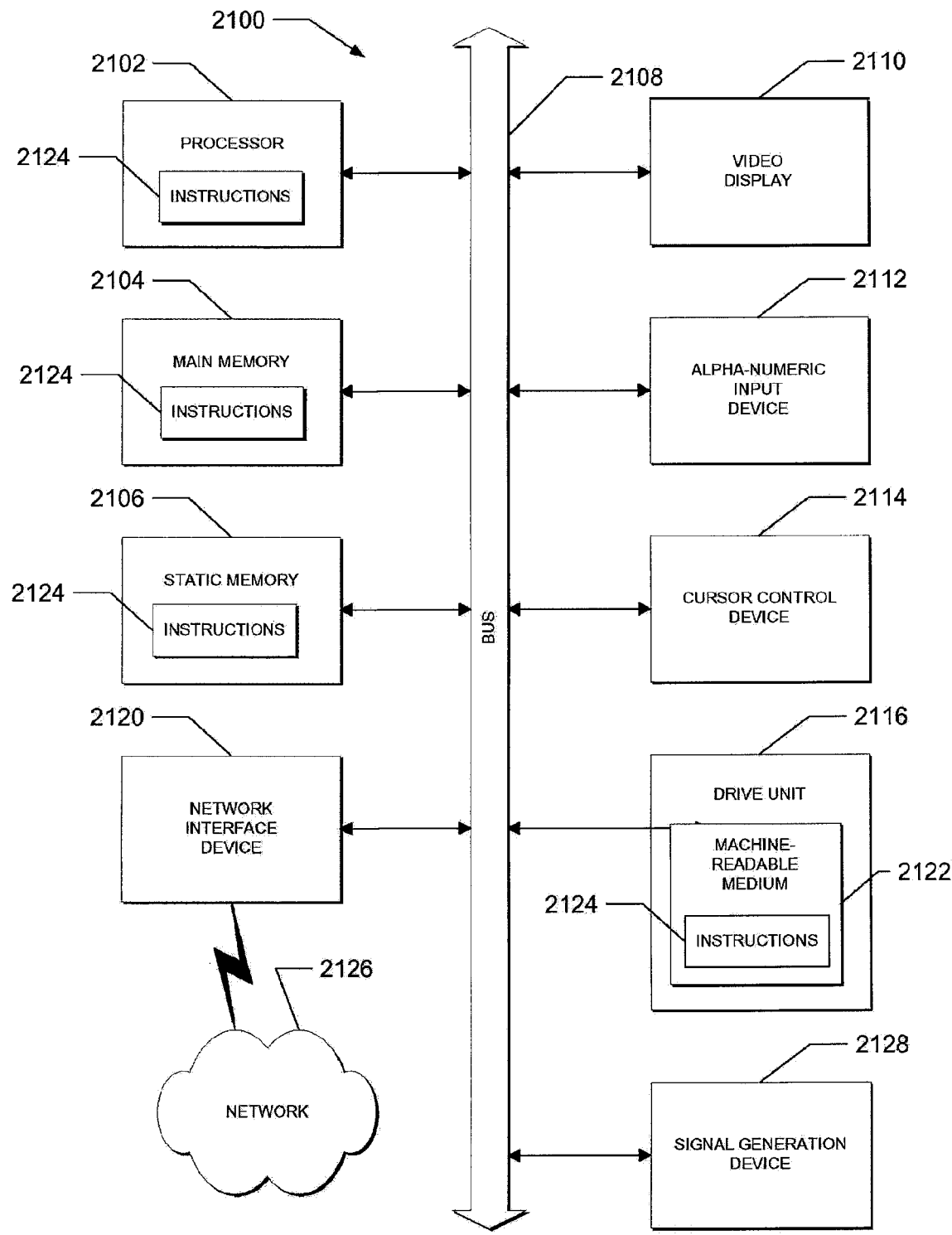
FIG. 21 is a simplified block diagram of a machine in the example form of a computing system within which a set of instructions for causing the machine to perform any one or more of the methodologies discussed herein may be executed.

FIG. 21 is a simplified block diagram of a machine in the example form of a computing system within which a set of instructions for causing the machine to perform any one or more of the methodologies discussed herein may be executed. In alternative embodiments, the machine may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 2100 includes a processor 2102 (e.g., a central processing unit (CPU), a graphics processing unit (GPU) or both), main memory 2104 and static memory 2106, which communicate with each other via bus 2108. The computing system 2100 may further include video display unit 2110 (e.g., a plasma display, a liquid crystal display (LCD) or a cathode ray tube (CRT)). The computing system 2100 also includes alphanumeric input device 2112 (e.g., a keyboard), user interface (UI) navigation device 2114 (e.g., a mouse), disk drive unit 2116, signal generation device 2118 (e.g., a speaker), and network interface device 2120.

A disk drive unit 2116 includes machine-readable medium 2122 on which is stored one or more sets of instructions and data structures (e.g., instructions 2124) embodying or used by any one or more of the methodologies or functions described herein. Instructions 2124 may also reside, completely or at least partially, within main memory 2104 and/or within the processor 2102 during execution thereof by the computing system 2100, with the main memory 2104 and the processor 2102 also constituting machine-readable, tangible media. Instructions 2124 may further be transmitted or received over a network 2126 via a network interface device 2120 using any one of a number of well-known transfer protocols (e.g., Hypertext Transfer Protocol (HTTP)).

While the machine-readable medium 2122 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that causes the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for embedding priorities in multimedia streams may be implemented with facilities consistent with any hardware system(s) defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A non-transitory computer-readable storage medium, comprising executable instructions to:
    access data associated with a visual representation including text;
    perform optical character recognition on the visual representation to identify at least one character of the text;
    extract color data from a first area and a second area, the first area forming part of the at least one character and the second area external to the at least one character; and
    calculate a color contrast value based on the first and second areas.

2. The non-transitory computer-readable storage medium of claim 1, wherein the instructions to access the data, perform the optical character recognition, extract the color data and calculate the color contrast are performed sequentially and automatically by a processor without human intervention.

3. The non-transitory computer-readable storage medium of claim 1, further comprising executable instructions to return the color contrast value.

4. The non-transitory computer-readable storage medium of claim 1, wherein the instructions to access data comprise obtaining a screenshot of the visual representation rendered on a display screen.

5. The non-transitory computer-readable storage medium of claim 1, wherein the instructions to extract the color data comprise executable instructions to:
    identify a plurality of intersection points between the first area and the second area, the plurality of intersection points including at least a first intersection point, a second intersection point and a third intersection point;
    extract character color data at a first color data point between the first intersection point and the second intersection point;
    extract external color data at a second color data point between the second intersection point and the third intersection point; and
    calculate the color contrast value based on the character color data and the external color data.

6. The non-transitory computer-readable storage medium of claim 5, wherein the plurality of intersection points are along a straight line intersecting a plurality of characters of the text.

7. The non-transitory computer-readable storage medium of claim 6, further comprising executable instructions to:
    calculate a plurality of color contrast values from the plurality of intersections points;
    compare each color contrast value of the plurality of color contrast values to a reference color contrast value; and
    selectively return a notification based on the comparison.

8. The non-transitory computer-readable storage medium of claim 6, further comprising executable instructions to:
    calculate a plurality of color contrast values along at least two spaced apart lines extending through characters in the text;
    compare each color contrast value of the plurality of color contrast values to a reference color contrast value; and
    selectively return a notification based on the comparison.

9. The non-transitory computer-readable storage medium of claim 1, further comprising executable instructions to:
    compare the color contrast value with a reference contrast value; and
    provide a notification based on the comparison.

10. The non-transitory computer-readable storage medium of claim 9, further comprising executable instructions to:
    calculate a plurality of contrast values using one or more characters in the text; and
    provide a display notification when a result of the comparison is less than a reference contrast value.

11. The non-transitory computer-readable storage medium of claim 1, wherein the instructions to extract the color data comprise executable instructions to:
    extract a first set of color data from the first area, and a second set of color data from the second area;
    identify a first luminosity value of the first set of color data, and a second luminosity of the second set of color data;
    adjust the luminosity of at least one of the first set of color data and the second set of color data so that the color contrast value for an adjusted set meets a reference color contrast value; and
    return suggested color data on, wherein the suggested color data is based on the adjusted set.

12. The non-transitory computer-readable storage medium of claim 11, further comprising executable instructions to automatically modify the visual representation based on the adjusted set.

13. The non-transitory computer-readable storage medium of claim 1, further comprising executable instructions to generate a graphical user interface component that displays the color contrast value.

14. The non-transitory computer-readable storage medium of claim 1, wherein the instructions are integrated within an application program for creating graphic representations.

15. An apparatus comprising:
    memory to store executable instructions; and
    a processor to execute the instructions, the instructions to:
    access data associated with a visual representation including text;
    perform optical character recognition on the visual representation to identify at least one character of the text;

extract color data from a first area and a second area, the first area forming part of the at least one character and the second area external to the at least one character; and calculate a color contrast value based on the first and second areas.

16. The apparatus of claim 15, wherein the instructions to access the data, perform the optical character recognition, extract the color data and calculate the color contrast are performed sequentially and automatically by a processor without human intervention.

17. The apparatus of claim 15, wherein the instructions display the color contrast value on a display screen.

18. The apparatus of claim 15, wherein the instructions to access data comprise obtaining a screenshot of the visual representation rendered on a display screen.

19. The apparatus of claim 15, wherein the instructions to extract the color data comprise instructions to:

identify a plurality of intersection points between the first area and the second area, the plurality of intersection points including at least a first intersection point, a second intersection point and a third intersection point;

extract character color data at a first color data point between the first intersection point and the second intersection point;

extract external color data at a second color data point between the second intersection point and the third intersection point; and calculate the color contrast value based on the character color data and the external color data.

20. The apparatus of claim 15, wherein the plurality of intersection points are selected to be along a straight line intersecting a plurality of characters of the text.

* * * * *